United States Patent
Reynolds

(10) Patent No.: US 7,140,106 B1
(45) Date of Patent: Nov. 28, 2006

(54) PROCESS TO RESTORE AND REFURBISH AN ENGINE TURBO CHARGER OR EXHAUST PART

(76) Inventor: Russell B. Reynolds, 10611 E. 30th St., Tulsa, OK (US) 74115

( * ) Notice: Subject to any disclaimer, the term of this patent is extended or adjusted under 35 U.S.C. 154(b) by 378 days.

(21) Appl. No.: 10/670,916

(22) Filed: Sep. 25, 2003

(51) Int. Cl.
*B23P 6/00* (2006.01)

(52) U.S. Cl. ............... 29/889.1; 29/889.5; 29/402.08; 29/402.06

(58) Field of Classification Search ............ 29/889.1, 29/889.5, 889, 402.08, 402.19, 402.03, 402.06
See application file for complete search history.

(56) References Cited

U.S. PATENT DOCUMENTS

| | | | |
|---|---|---|---|
| 4,028,788 A | | 6/1977 | DeMusis .................. 29/156.8 |
| 4,611,744 A | * | 9/1986 | Fraser et al. ................ 228/119 |
| 4,878,953 A | * | 11/1989 | Saltzman et al. ........... 148/512 |
| 4,982,066 A | * | 1/1991 | Waring ................. 219/137 PS |
| 5,606,797 A | * | 3/1997 | Reynolds ................... 29/889.1 |
| 5,873,703 A | * | 2/1999 | Kelly et al. ............. 416/241 R |
| 6,199,746 B1 | * | 3/2001 | Dupree et al. ............. 228/119 |
| 6,532,656 B1 | * | 3/2003 | Wilkins et al. ........... 29/889.1 |

* cited by examiner

*Primary Examiner*—Marc Jimenez
(74) *Attorney, Agent, or Firm*—Head, Johnson & Kachigian

(57) ABSTRACT

A process to restore and refurbish an engine part or accessory. The process includes the steps of visually inspecting the pair or accessory for cracks, erosion or broken areas. Selected areas of the part or accessory are then machined or drilled off. The selected areas of the part or accessory are then built up in excess of finished dimensions by welding. Finally, the selected areas of the part or accessory are machined to their finished dimensions.

13 Claims, 3 Drawing Sheets

PROCESS TO RESTORE AND REFURBISH AN ENGINE TURBO CHARGER OR EXHAUST PART

BACKGROUND OF THE INVENTION

1. Field of the Invention.

The present invention is directed to a process to restore and refurbish an engine turbo charger or exhaust part which has been subject to corrosion, pitting or breakage from use. In particular, the present invention is directed to a process to restore and refurbish selected airplane engine parts or accessories to their original finished dimensions.

2. Prior Art.

Various internal combustion engine parts and accessories are subject to Corrosion, pitting, wear and breakage from use. The parts or accessories may be constituted of stainless steel, aluminum, or high-strength alloy. Typically, after corrosion, pitting, wear, or breakage, the part or accessory is simply removed and then replaced with a new part or accessory.

In the case of aircraft engines, because of manufacturer standards and because of government regulations, the various parts and accessories of the engine must be dismantled and inspected after a number of hours of use. As an example, it may be required to dismantle and inspect certain airplane engine parts and accessories every 500 to 1800 hours of use.

There have been known procedures in the past to repair various internal combustion engine parts. While grinding and welding procedures have been used, the surface areas are ground down to a new surface which is not the original dimension.

It is, therefore, a principal object and purpose of the present invention to no longer discard such parts or accessories after use and operation.

It is a principal object and purpose to provide a process to restore and refurbish engine turbo charger and exhaust parts by machining or drilling selected areas, building up the selected areas in excess of original dimensions, and machining to finished dimensions.

SUMMARY OF THE INVENTION

The present invention pertains to a process to restore and refurbish an engine turbo charger or exhaust part such as a turbo charger exhaust housing constructed of cast iron, stainless steel, steel or alloys. Through operation and use, various cracks, broken areas or eroded areas may appear in an engine turbo charger or exhaust part. In order to restore and refurbish in accordance with the present invention, initially, the housing is sand or bead blasted with media in order to remove rust, carbon and scale from the housing. Thereafter, the housing may be washed in a solvent so that oil residue or grease is removed.

Once this has been accomplished, the housing is inspected visually for cracks, erosion or broken areas. A liquid die penetrant may also be applied to inspect for possible cracks.

All external cracks are thereafter removed by grinding or other procedures.

In the event of internal cracks or erosion, a hole or opening is made through an external wall of a tubular portion of the housing using a gouging rod or plasma cutter. Once access to the interior is accomplished, any internal cracks or eroded areas can be repaired by reaching through the opening.

Thereafter, the housing is preheated and the welding process takes place. All cracks or stud holes are welded by application of weld beads in excess of the original finished dimensions. Periodically, each weld bead is peened in order to eliminate stress build up.

In the event of internal cracks or eroded areas, the internal area is welded by reaching the weld electrode through the large opening at the inlet flange area and starting a weave pattern. Additionally, internal welding of internal cracks may be accomplished by performing welding through the opening made in the tubular portion.

Once welding has been completed, the housing is placed in an oven and reheated to approximately 500° F. for a time period such as five hours in order to normalize.

After cooling, the grinding or machining process may be performed. Each area of welding that has been performed is ground smooth back to the original dimensions and contours. The access weld hole is also filled by welding.

A final inspection is visually performed and a liquid die penetrant is utilized to check for cracks. The housing is then re-blasted Using glass, bead or other media. Finally, the housing may be cleaned with a solvent and painted to inhibit rust during storage and shipment.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
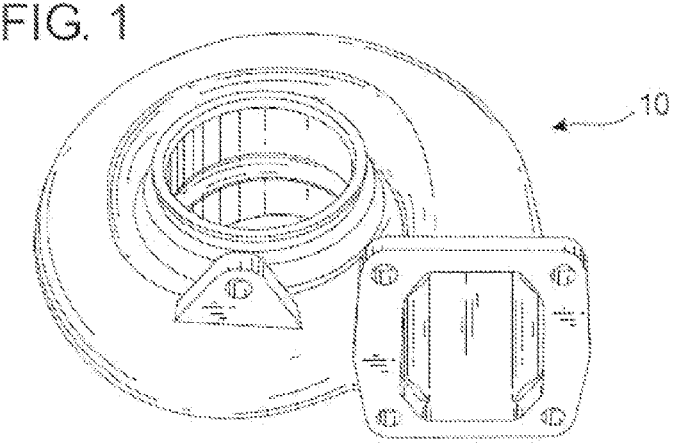
FIG. 1 illustrates a turbocharger housing engine part which may be restored and refurnished in accordance with the present invention.

Referring to the drawings in detail, FIG. 1 shows a perspective view of an engine turbocharger or exhaust part that may be restored and refurbished in accordance with the present invention. In FIGS. 1 through 13, a turbocharger exhaust housing 10 is illustrated. The exhaust housing may be constructed of various materials, such as aluminum, cast iron, stainless steel, steel or alloys.

Figure 2:
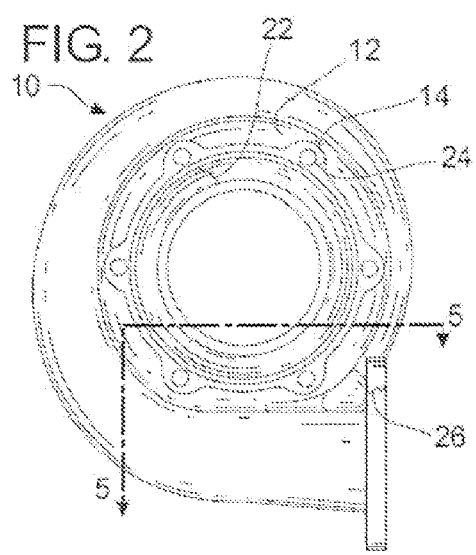
FIGS. 2 through 5 illustrate turbocharger housing having various cracks, worn and eroded areas after use.
Figure 3:
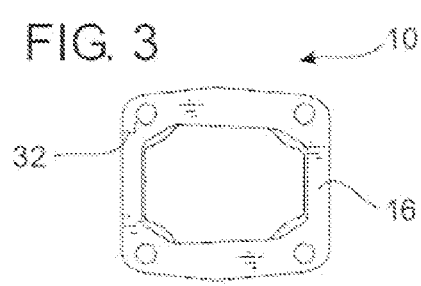
Figure 4:
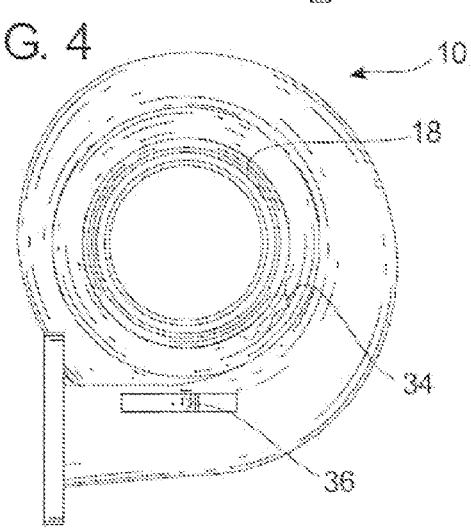
Figure 5:
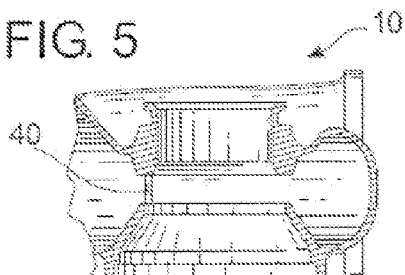

FIGS. 2, 3, 4 and 5 show various views of an exhaust housing 10 after a period of use. FIG. 2 shows the wheel mounting side 12 with receptacles 14 for receiving studs in the exhaust to connect with the cold section of the turbocharger (not shown) FIG. 3 illustrates the exhaust intake flat mounting flange 16 which is the exhaust intake. The exhaust intake flange may take various configurations. FIG. 4 illustrates the exhaust side 18 of the housing 10 which mates with the exhaust (not shown). FIG. 5 illustrates a sectional view taken along section line 5—5 of FIG. 2.

As seen in FIGS. 2 through 4, various cracks 22, 24, 26, 28, 30, 32, 34 and 36 are seen in the exhaust housing 10. Cracks 22 and 24 are on the wheel mounting side of the housing 10. As seen in FIG. 5, an interior tongue 40 has a portion eroded or worn away. Each of these cracks, eroded or broken areas may be restored and refurbished in accordance with the present invention.

The process consists of a number of discrete steps. Initially, the housing 10 is sand or bead blasted with glass, sand or other media in order to remove rust, carbon and scale from the housing 10. Thereafter, the housing 10 is washed in a solvent. Oil residue and grease is thereby removed.

Once this has been accomplished, the housing 10 is inspected visually for cracks, erosion or broken areas. Any studs are also visually inspected. Liquid die penetrant is applied to also inspect for possible cracks. In one process, a dye check aerosol spray is applied so that cracks become more visible after application.

A test weld may be attempted in order to confirm that the housing is suitable for restoration and refurbishment.

In one procedure, once it is determined that the housing is repairable, it is stamped for repair identification. In the event that a fastener stud is broken off and remains in the housing 10, the stud can be removed by utilizing a drill bit and drill fixture. If the stud area is cracked beyond limits established, the repair procedure is to remove the crack all the way to the base. Thereafter, the hole will be welded and filled and a new hole will be drilled as a part of the repair.

In accordance with the procedure of the invention, all external cracks are thereafter removed by grinding using a die grinder with cutting wheels, carbide burrs or stones. The cracks may alternatively be removed by other procedures such as a plasma cutter or gouging rods.

Figure 6:
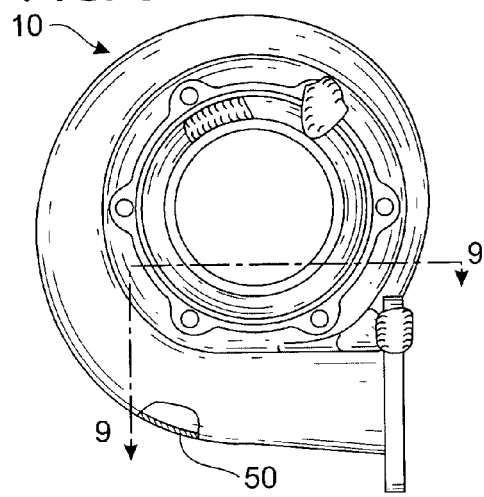
FIGS. 6 through 9 illustrate a turbocharger housing after application of weld beads in accordance with the process of the present invention.
Figure 7:
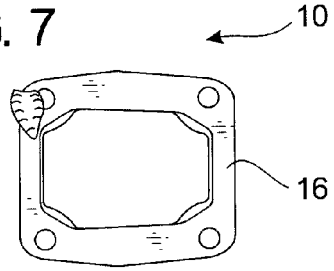
Figure 8:
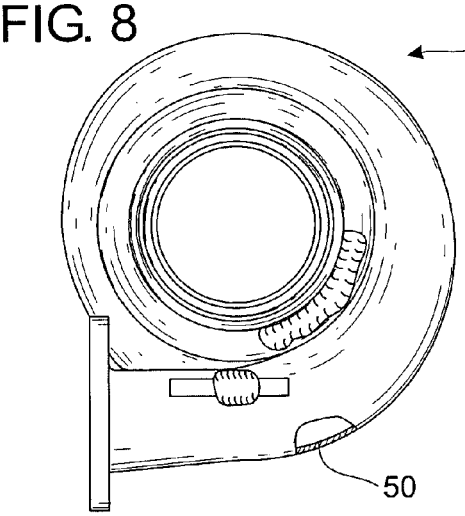
Figure 9:
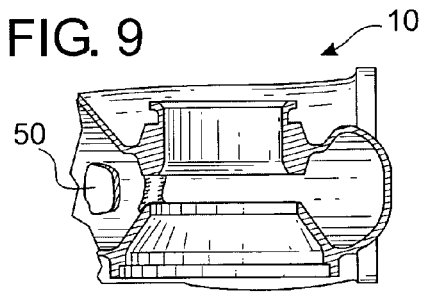
Figure 10:
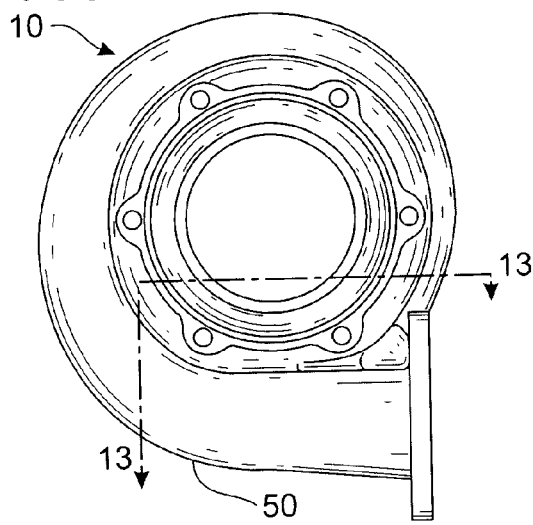
FIGS. 10 through 13 illustrate a turbocharger housing which has been restored and refurbished to original dimensions.
Figure 11:
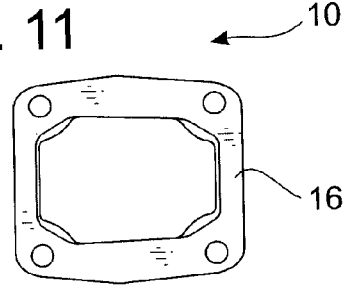
Figure 12:
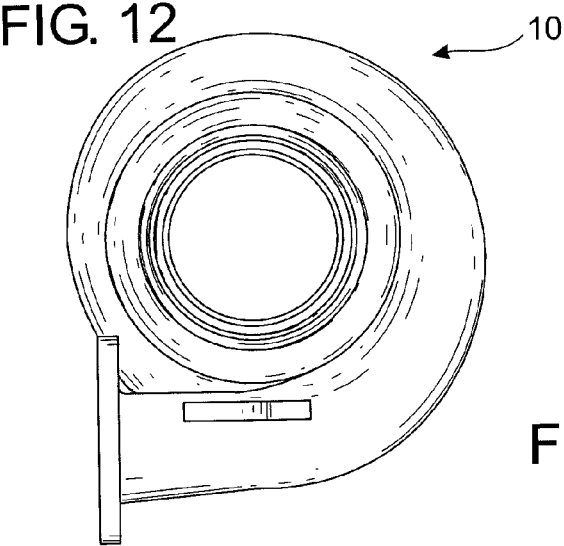
Figure 13:
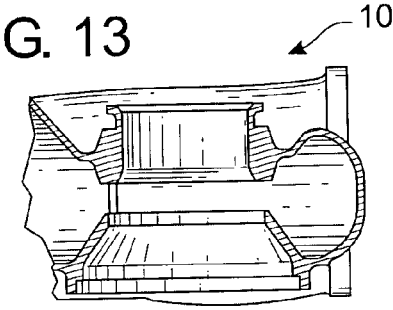

In the event of internal cracks or erosion, such as the tongue 40 in FIG. 5, a hole or opening approximately 1" diameter is made through an external wall of a tubular portion using known gouging rod or a plasma cutter. The center of the hole or opening is generally 4" to 5" from the flat mounting flange area. FIGS. 6, 8 and 9 illustrate this opening 50.

Once access to the interior is accomplished, any internal cracks or eroded areas can be repaired. Reaching through the hole or opening 50, the crack or eroded area is blown or cut out and bad material is removed. Once all of the broken, cracked and eroded areas are removed, the housing 10 is then placed in an oven and preheated to approximately 500° F. A pyrometer or temperature sticks may be used to determine when the housing 10 is at the proper temperature. Once preheated, the welding process begins which may be accomplished a number of ways.

FIGS. 6 through 9 illustrate the welding process. In one preferred procedure, ⅛" NiROD 99 or 99x or equivalent rods are used as filler materials. For other metal, such as stainless steel, the appropriate red should be used. All external cracks or stud holes are welded by application of weld beads in excess of the original and finished dimensions. Periodically, each weld bead is peened in order to eliminate stress build up. The peening process uses a pneumatic needle scaler with ⅛" blunt tip needles and regulated air pressure in order to relieve stress in the housing 10. In the event that the temperature falls below 400° F., the housing is reheated.

In the event of any internal cracks or eroded areas, the internal area is welded by reaching the weld electrode through the large opening at the intake flange area and starting a weave pattern. In the event that internal cracks are to be repaired, the welding is performed through the opening 50 made.

Once the welding has been completed, the housing 10 is placed in an oven and reheated to approximately 500° F. for a time period such as five hours in order to normalize. The oven is then turned off and left to cool down with the housing 10 inside. Alternately, the housing may be cooled down in open air. When the housing is below 100° F., the repair process may be continued.

After cooling, the grinding or machining process may be performed. Each area where welding has been performed is ground smooth back to the original dimensions and contours. Again, the housing is visually inspected for cracks and all weld areas are peened for stress relief.

The housing is placed in the oven and heated to 500° F. in preparation to weld up the access hole 50 that has been made. This weld is accomplished using the same filler mentioned above. Successive passes may be made around the inside and around the outside. The entire hole is completely filled and the peening process is performed to relieve stress. The access hole 50 is then machined smooth both inside and out to match the original contour wall thickness and dimensions and then finished by further peening.

The housing 10 is thereafter placed in an oven at approximately 500° F. for five hours for normalizing the material, then allowed to cool.

A final inspection is visually performed and a liquid die penetrant is again utilized to check for cracks. The housing 10 is then re-blasted using glass bead or star blast media or the like. The housing may then be cleaned with a solvent and painted to inhibit rust during storage or shipment.

FIGS. 10 through 13 show the completed part after it has been restored and refurbished. It has been found that the weld materials and weld areas are stronger than the original housing.

The foregoing process may be utilized with various engine turbocharger or exhaust parts such as a waste gate, a transition housing or a bearing housing.

Whereas, the present invention has been described in relation to the drawings attached hereto, it should be understood that other and further modifications, apart from those shown or suggested herein, may be made within the spirit and scope of this invention.

What is claimed is:

1. A process to restore and refurbish an airplane engine part or accessory having a tubular portion, which process comprises:
    visually inspecting said part or accessory for cracks, erosion, or broken areas;
    making an opening in a wall of said tubular portion to access an interior of said tubular portion to repair any internal cracks, erosion or broken areas;
    machining or drilling off selected areas of said part or accessory;
    building up said selected areas by welding of said part or accessory in excess of finished dimensions;
    machining said selected areas of said part or accessory to their finished dimensions; and
    filling said opening in said wall of said tubular portion by welding.

2. A process to restore and refurnish an airplane engine part or accessory as set forth in claim 1 wherein said engine part is a turbo charger exhaust housing.

3. A process to restore and refurnish an engine part or accessory as set forth in claim 1 wherein engine part is a waste gate.

4. A process to restore and refurbish an engine part or accessory as set forth in claim 1 wherein said engine part is a transition housing.

5. A process to restore and refurbish an engine part or accessory as set forth in claim 1 wherein said engine part is a bearing housing.

6. A process to restore and refurbish an airplane engine part or accessory as set forth in claim 1 wherein said step of building up said selected areas by welding is accomplished by application of a plurality of weld beads and said process includes peening said part or accessory and said selected areas with a needle scaler after application of each said weld bead in order to relieve stress.

7. A process to restore and refurbish an airplane engine part as set in claim 1 including the additional steps or grinding off any broken or cracked flanges on said part and building up each said flange in excess of finished dimensions.

8. A process to restore and refurbish an airplane engine part as set forth in claim 1 including the additional, initial steps of:
   cleaning said part with a liquid solution to remove oil and grease residue; and
   removing carbon and other debris by blasting said part with bread media.

9. A process to restore and refurbish an airplane engine part as set forth in claim 1 including the additional step of applying a liquid die penetrant to said part to identify cracks therein prior to welding.

10. A process to restore and refurbish an airplane engine part as set forth in claim 1 including the additional step of preheating said part prior to building up by welding.

11. A process to restore and refurbish an airplane turbo charger exhaust housing, which process comprises:
   visually inspecting said turbo charger waste housing for cracks, erosion or broken areas;
   machining or drilling off all cracks, eroded or broken areas;
   accessing any internal cracks or erosion by making an opening in a wall of a tubular portion to access an interior;
   building up selected areas of said housing by welding an excess of finished dimension;
   machining said selected areas of said turbo charger waste housing to their finished dimensions; and
   filling said opening in said wall of said tubular portion by welding.

12. A process to restore and refurbish an airplane turbo charger exhaust housing as set forth in claim 11 wherein said selected areas include an exhaust intake mounting flange, studs in exhaust flange on a wheel mounting side, and an exhaust side surface that the exhaust port mates with an exhaust and a tongue area.

13. A process to restore and refurbish an airplane turbo charger exhaust housing as set forth in claim 11 including the additional, initial steps of:
   cleaning said part with a liquid solution to remove oil and grease residue; and
   removing carbon and other debris by blasting said part with bead media.

* * * * *